US00RE34111E

United States Patent [19]

Wynn

[11] E

Patent Number: Re. 34,111

[45] Reissued Date of Patent: Oct. 27, 1992

[54] APPARATUS FOR OPERATING A GAS AND OIL PRODUCING WELL

[76] Inventor: Samuel R. Wynn, 1110 Phillips St., Apt. #1, Marietta, Ohio 45750

[21] Appl. No.: 831,107

[22] Filed: Feb. 4, 1992

Related U.S. Patent Documents

Reissue of:

[64] Patent No.: 4,526,228
Issued: Jul. 2, 1985
Appl. No.: 459,000
Filed: Jan. 18, 1983

[51] Int. Cl.[5] ..... E21B 43/12; E21B 47/06

[52] U.S. Cl. ..... 166/53; 166/64; 166/66; 166/105; 417/58

[58] Field of Search ..... 166/53, 64, 105, 106, 166/65.1, 66, 72, 372; 417/56, 57, 58

[56] References Cited

U.S. PATENT DOCUMENTS

| | | | |
|---|---|---|---|
| 3,012,513 | 12/1961 | Knox | 417/57 |
| 3,053,188 | 9/1962 | Dinning et al. | 417/56 |
| 3,203,351 | 8/1965 | Gillis | 417/57 |
| 3,266,574 | 8/1966 | Gandy | 166/53 |
| 3,276,469 | 10/1966 | Storm | 166/53 |
| 3,396,793 | 8/1968 | Piper et al. | 166/53 |
| 3,517,553 | 6/1970 | Williams et al. | 166/66 |
| 3,863,714 | 2/1975 | Watson | 166/53 |
| 3,991,825 | 11/1976 | Morgan | 166/68 |
| 4,150,721 | 4/1979 | Norwood | 166/53 |
| 4,211,279 | 7/1980 | Isaaks | 166/64 |
| 4,267,885 | 5/1981 | Sanderford | 166/256 |
| 4,352,376 | 10/1982 | Norwood | 166/53 |
| 4,355,365 | 10/1982 | McCracken et al. | 166/64 |
| 4,410,038 | 10/1983 | Drapp | 166/53 |

*Primary Examiner*—Stephen J. Novosad
*Attorney, Agent, or Firm*—Laubscher & Laubscher

[57] ABSTRACT

Apparatus is disclosed for automatically operating a gas and oil producing well of the plunger lift type, including a comparator for comparing casing and tubing pressures, a device for opening the gas delivery valve when the difference between casing and tubing pressure is less than a selected minimum value, a device for closing the gas discharge valve when casing pressure falls below a selected casing bleed value, an arrival sensor switch for initially closing the fluid discharge valve when the plunger reaches the upper end of the tubing, and a device for reopening the fluid discharge valve at the end of a given downtime period in the event that the level of oil in the tubing produces a pressure difference greater than the given minimum differential value, and the casing pressure is greater than lift pressure. The gas discharge valve is closed if the pressure difference exceeds a selected maximum value, or if the casing pressure falls below a selected casing bleed value. The fluid discharge valve is closed if tubing pressure exceeds a maximum safe value. In the event that the plunger does not reach the upper end of the tubing during a selected uptime period, a lockout indication is presented on a visual display device, and the well is held shut-in until the well differential is forced down to the maximum differential setting of the device. When this occurs, the device will automatically unlock and normal cycling will resume.

30 Claims, 7 Drawing Sheets

APPARATUS FOR OPERATING A GAS AND OIL PRODUCING WELL

Matter enclosed in heavy brackets [ ] appears in the original patent but forms no part of this reissue specification; matter printed in italics indicates the additions made by reissue.

BRIEF DESCRIPTION OF THE PRIOR ART

It is well known in the prior art to provide systems for controlling the operation of oil and gas producing wells of the plunger lift type, as evidenced, for example, by the patents to Norwood U.S. Pat. No. 4,150,721, Isaacks U.S. Pat. No. 4,211,279, Morgan U.S. Pat. No. 3,991,825 and Knox U.S. Pat. No. 3,012,513. Similarly, the use of pressure differential control systems in the well production art is well known, as shown by the patents to Dinning et al. U.S. Pat. No. 3,053,188, Gandy U.S. Pat. No. 3,266,574, Piper U.S. Pat. No. 3,396,793, Storm et al. U.S. Pat. No. 3,276,469, Williams et al. U.S. Pat. No. 3,517,553, Sanderford U.S. Pat. No. 4,267,885, and Watson U.S. Pat. No. 3,863,714. As indicated by these prior patents, the four ways commonly used in the art for controlling the production of a well of the plunger lift type are by manually opening and closing valves at proper times and in proper sequence at the well head, by automatically opening and closing valves at the well head with a time on/off cycling device, by automatically opening and closing valves at the well head by monitoring the differential pressure between the annulus and the production tubing of the well, and by automatically opening and closing valves at the well head by a combination of time cycling and monitoring of differential pressure.

These known well production control systems possess certain inherent drawbacks. First, the mechanical type of plunger lift control systems are rather limited in terms of the control functions that are provided, and consequently result often in loss of production and the accompanying additional expense, since the systems are not utilized to their fullest capacity. Moreover, many systems require close tolerances, and are difficult to maintain in the field, owing to the build up of sand, paraffin, ice and other foreign material.

SUMMARY OF THE INVENTION

The present invention was developed to provide a low cost maintenance-free system that is capable of maintaining, correcting and utilizing all means necessary to control a plunger lift production system to its fullest efficiency. Thus, instead of trying to rid the wells of their nuisance fluids, the present invention is directed to extracting these fluids from the well for additional profit for the producer. While many so-called stripper wells are at the point of abandonment owing to their high production costs, the system of the present invention is relatively inexpensive compared to other, less efficient systems, and has proven in practice to increase oil and gas production from wells by as much as two or three times their previous production.

According to the primary object of the invention, an oil and gas well production control system is provided including comparator means for comparing the casing and tubing pressures, means for opening the gas discharge valve when the difference between casing and tubing pressure is greater than a selected minimum value, thereby to deliver gas for sale, and to permit the build up of oil-containing fluid in the tubing above the plunger, means for opening the fluid discharge valve when the casing pressure exceeds a selected lift value, whereby the plunger moves upwardly in the tubing, and fluid is discharged via the fluid branch leg, and means for initially closing the fluid discharge valve when the plunger reaches the upper end of the tubing, thereby terminating the discharge or fluid and initiating the fall of the plunger toward the bottom of the tubing. Means are provided for closing the gas discharge valve when casing pressure falls below a selected casing bleed value, and means are provided for reopening the fluid discharge valve after a given downtime period in the event that the oil level produces a pressure difference greater than the given minimum differential value, and the casing pressure is greater than lift pressure.

In accordance with a more specific object of the invention, means are also provided in the control system outlined above for opening the gas discharge valve at the end of the selected downtime period when the pressure differential is less than the minimum difference value, and when the casing pressure is above the selected casing bleed value. Means are also provided for closing the gas discharge valve when the difference between casing and tubing pressures exceeds a given maximum value, and for closing the fluid discharge valve in the event that tubing pressure exceeds a given maximum safe pressure value. In accordance with a characterizing feature of the invention, means are provided for establishing a selected downtime period during which the plunger is expected to fall from the top to the bottom of the tubing, and an uptime period during which the fluid discharge valve is to remain open during the upward movement of the plunger. Display means are provided for presenting a first indication at the beginning of the uptime period, and a second indication in the event that the plunger fails to reach the top of the tubing during the uptime period.

In accordance with another feature of the invention, the display means are selectively operable to display static casing pressure, static tubing pressure, the difference between casing and tubing pressures, the selected casing bleed pressure value, the selected lift pressure, the selected maximum pressure difference value, the selected minimum pressure difference value, the maximum safe discharge pressure, and the number of cycles of plunger operation that have occurred within a given period of time, respectively. Means including a range switch and a pair of variable tap switches are provided for selectively setting the plunger uptime and downtime periods, respectively.

According to a further object of the invention, the gas discharge valve is opened in a plurality of successive steps, thereby to prevent a sudden surge of gas from bringing the plunger to the upper end of the tubing while in a dry condition. Emergency override switch means are operable to close both of the gas and fluid discharge valves, and manual switch means are provided for opening and closing the fluid and gas discharge valves, respectively.

According to another object, the pressure gas from the casing is supplied to a pneumatic system for operating diaphragm pressure motor means that open the gas and fluid valves, respectively, from their normally closed conditions. Regulator means are provided for regulating the gas pressure supplied to operate the diaphragm pressure motors, respectively, and needle valve means control the speed of operation of the gas and fluid discharge valves.

BRIEF DESCRIPTION OF THE DRAWINGS

Other objects and advantages of the invention will become apparent from a study of the following specification when viewed in the light of the accompanying drawing, in which.

DETAILED DESCRIPTION

The Lift Plunger System

Figure 1:
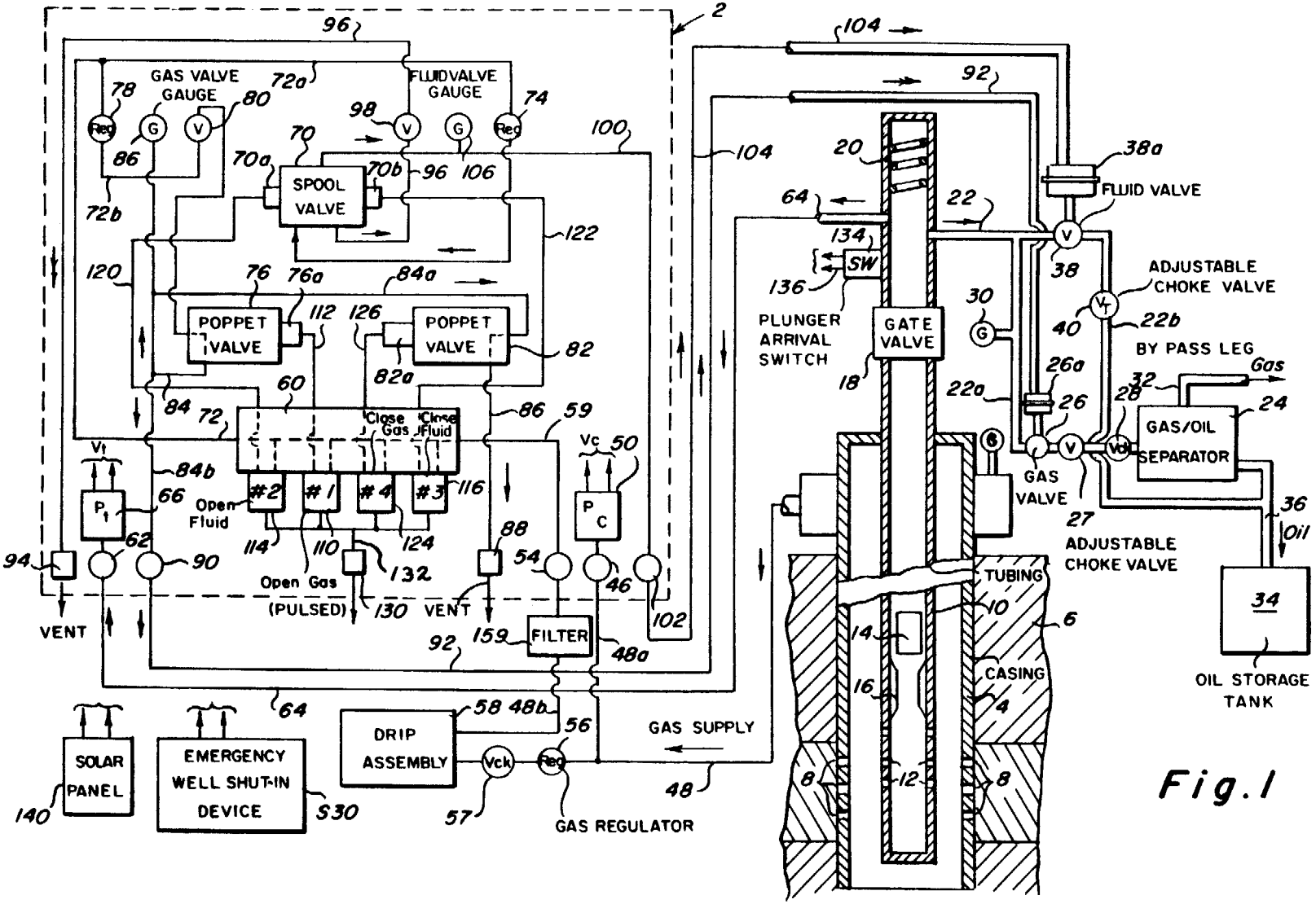
FIG. 1 is a schematic diagram of the pneumatic circuitry of the control system of the present invention for controlling the operation of a plunger lift type oil and gas producing well.

Referring first more particularly to FIG. 1, the differential control panel 2 of the present invention is adapted to operate a fuel gas and oil well of the known plunger lift type. More particularly, the lift type gas and oil well includes a casing 4 that is driven and cemented within an oil-bearing formation 6. The casing includes a plurality of perforations 8 through which the oil and gas are introduced within the casing. Mounted in concentrically spaced relation within the casing 4 is the vertical tubing 10 that extends at its upper end through the closed upper end of the casing 4. The tubing 10 contains a plurality of perforations 12 through which the fuel gas and oil in the casing are introduced within the tubing. Mounted for vertical movement within the tubing is a conventional lift-type plunger 14, the lower limit of travel of the plunger being determined by the seating nipple 16 which is secured within the tubing 10 at an elevation above the perforations 12. Above the upper end of the casing 4, the tubing 10 is provided with a gate valve 18, the upper extent of travel of the plunger being limited by a conventional bumper spring 20 that is mounted within the closed upper end of the tubing 10.

Fuel gas and oil are discharged from the upper end of tubing 10 via discharge conduit 22 having a gas leg 22a and a by-pass leg 22b. The gas leg 22a is connected with a gas/oil separator 24 via diaphragm-operated gas valve 26, adjustable choke valve 27, and check valve 28. An indication of the pressure of the fluid in the gas leg 22a is indicated by gauge 30. Gas from the gas/oil separator 24 is discharged for sale via discharge conduit 32, and oil from the separator 24 is discharged into the oil storage tank 34 via conduit 36. The by-pass leg 22b contains a diaphragm-operated oil valve 38, and an adjustable choke valve 40. Gas valve 26 and oil valve 38 are normally in the closed condition in the absence of the supply of pressure fluid to the working chambers of the diaphragm motors associated therewith.

In accordance with the present invention, gas from the casing 4 is supplied to a first conduit fitting 46 on the differential control panel 2 via gas supply conduit 48 and first branch leg 48a. A casing pressure transducer 50 is connected with fitting 46 for providing an electrical signal Vc that is a function of the casing pressure. The gas supply from conduit 48 is also supplied to a second conduit fitting 54 via second branch conduit 48b containing gas regulator 56, drip assembly 58 and filter 59. The gas supply at conduit fitting 54 is supplied by conduit 59 to the input connection at one end of the manifold 60. The differential control panel includes a third conduit fitting 62 that is connected with the tubing 10 via conduit 64, thereby to supply tubing pressure to the tubing transducer 66 which generates an electrical tubing pressure signal Vt.

The manifold 60 has an exhaust port for sypplying the gas to the input opening of a two-position spool valve 70 via conduit 72 and first branch conduit 72a containing the adjustable pressure regulator 74. Furthermore, the gas supply from the manifold output is supplied to the input opening of normally closed first poppet valve 76 via second branch leg 72b containing second pressure regulator 78 and adjustable needle valve 80. Poppet valve 76 has an outlet opening that is connected with an inlet opening of second poppet valve 82 via conduit 84 and branch conduit 84a, the pressure in this conduit branch being indicated on gas valve pressure gauge 86. The outlet from poppet valve 82 is connected with atmospheric vent via conduit 86 and vent opening 88. The outlet of the first poppet valve 76 is also connected with the working chamber of the diaphragm operator 26a of the gas valve 26 via branch conduit 84b, conduit fitting 90, and conduit 92. Similarly, the two-position spool valve 70 has a first outlet that is connected with vent 94 via conduit 96 containing needle valve 98, and a second outlet opening that is connected with the working chamber of the diaphragm operator 38a of the fluid valve 38 via conduit 100, conduit fitting 102, and conduit 104. The pressure in this fluid valve control conduit 100 is indicated on fluid valve gauge 106.

The manifold 60 is provided with a first outlet passage controlled by a first solenoid 110 that is operable to supply gas pressure to the actuator 76a of poppet valve 76 via conduit 112, and a pair of passages controlled by solenoids 114 and 116 for supplying pressure gas to the left and right operators 70a and 70b via conduits 120 and 122, respectively. Finally, the manifold 60 includes a fourth outlet passage controlled by solenoid 124 for supplying pressure gas to the operator 82a of poppet valve 82 via conduit 126. When each of the solenoids 110, 114, 116, and 124 is in the de-energized condition, the manifold passage associated therewith is connected with vent 130 via conduit 132.

Mounted on the upper end of the tubing 10 above gate valve 18 is a plunger arrival switch 134 that supplies an electrical signal across conductors 136 when the plunger 14 reaches the upper end of tubing 10.

In accordance with a further feature of the system, a 12 volt solar panel 140 is provided for maintaining a full charge on the battery supply of the system. The solar panel is capable of keeping the battery fully charged when receiving an average of 3 hours of normal sunlight each day. The pole drip assembly 58 is a 2" standpipe provided with the necessary fittings for supplying pressure gas from the casing to the system. The pole drip assembly provides a means for settling out the contaminates in the gas (such as dirt and water) and serves as a volume tank so that the supply gas passing through it to the system will not be exchanged each time the system is cycled. The high pressure regulator 56 provided with the by-pass check valve 57 is adjusted to maintain a constant supply pressure of 50 to 60 psi into the pole drip assembly.

Finally, a remotely located emergency well shut-in switch 130 is provided which is operable to close both the external gas discharge valve 26 and the fluid discharge valve 38, thereby closing the well. When the switch is opened, the system returns to its normal operation.

THE DIFFERENTIAL CONTROL PANEL

Figure 2:
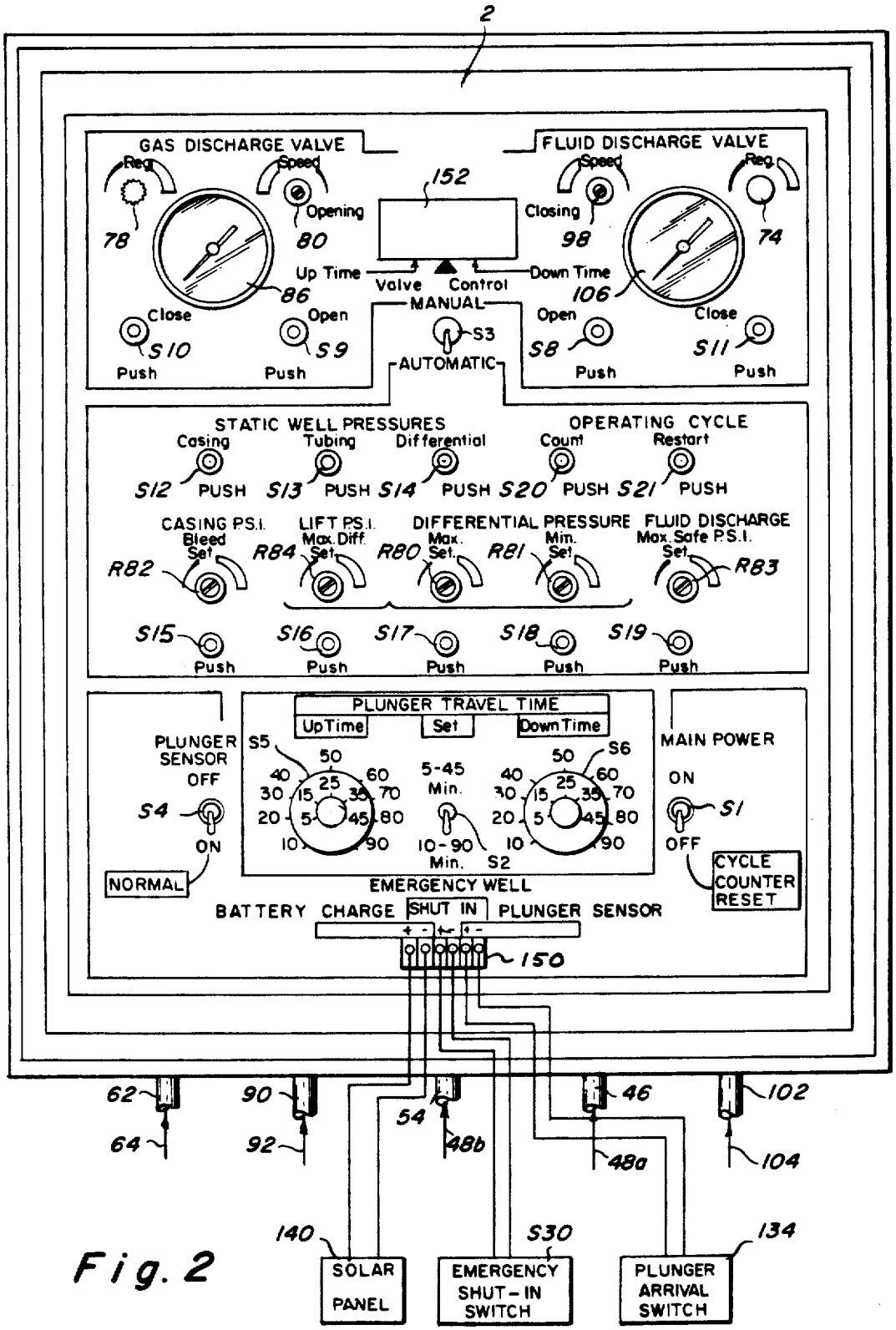
FIG. 2 is a front view of the operating panel of the control system of the present invention.

Referring now to FIG. 2, the differential control panel 2 includes adjacent its bottom a six-screw terminal strip 150 for electrical connection with the solar panel 140, the emergency shut-in switch S30, and the plunger arrival switch 134. The panel also includes the conduit bulkhead fittings 62, 90, 54, 46 and 102 for connection with the pneumatic conduits 64, 92, 48b, 48a and 104, respectively.

All venting of the pneumatic apparatus as well as venting of the enclosure is made through ⅛" pipe bulkhead fittings 94, 130 and 88 (FIG. 1) on the bottom of the enclosure. The vent openings are covered with metal mesh to prevent them from becoming clogged by insects, dirt or the like.

The panel enclosure contains the Control System face panel, electronic logic, the pneumatic apparatus, a 6-volt, 9AHR rechargeable battery that supplies power to the electronic logic, and four 6-volt pneumatic solenoid valves. All controls on the face panel are accessed by unlatching the hinged door front of the enclosure. The control face panel is mounted by four 4" standoffs which are attached to the back side of the enclosure. The face panel is hinged, allowing the panell to swing open for access to the electronic circuitry, supply battery, and the pneumatic apparatus that is mounted internally.

The Control System face panel contains all operator manual controls and operating adjustments, a liquid crystal display (LCD) 152, and the two pressure gauges 86 and 106 for displaying pressures and operation status of the system. The 100 p.s.i. gauges 86 and 106 are operable—in either the manual or the automatic operating modes as determined by switch S3—to display a pressure reading indicative of whether the associated gas and fluid supply valves, respectively, are open or closed, or in the process of opening or closing. A zero pressure reading indicates a closed valve condition in which the associated diaphragm operator is vented to atmosphere. When the manual/automatic switch S3 is in its manual position, switches S9 and S10 are operable to open and close the gas discharge valve 26, respectively, and switches S8 and S11 are operable to open and close the fluid dischage valve 38, respectively.

The regulator settings 74 and 78 associated with the oil and gas gauges are operable to adjust the operating pressures of the diaphragm motor operators 38a and 26a of the fluid and gas discharge valves, respectively. The pressure of each diaphragm operator is normally adjusted to a minimum of 30 p.s.i. The needle valve adjustment 90 controls the speed of opening of the gas discharge valve 26, and the needle valve adjustment 98 controls the speed of closing of the fluid discharge valve 38.

Push button switches S12, S13 and S14 are operable to display on the four-digit liquid crystal display 152 casing pressure, tubing pressure, and differential pressure (i.e., the pressure difference between casing pressure, respectively, and tubing pressure). Moreover, by operating the count push button switch S20, there is displayed on LCD 152 a count equal to the number of times the system has completed a full automatic operating cycle within a given period of time (such as 24 hours). The cycle counter resets to zero only when the power switch S1 is turned off. The counter will count to 9,999 cycles.

The differential control panel 2 also includes a minimum differential setting adjustment R81 which controls the minimum amount of fluid that will be lifted, thereby preventing the plunger from cycling dry. The maximum differential setting adjustment R80 permits the operator to control the largest amount of liquid that can be lifted with a known lift pressure, thus preventing the well from becoming loaded. The maximum safe fluid discharge pressure adjustment R83 allows the operator to control the amount of pressure that can be safely discharged into a tank or pit, and the casing p.s.i. bleed adjustment R82 permits the operator to choose the lowest desired casing pressure setting. Thus, when the gas discharge valve is open to sell gas, the well will automatically shut down until the casing pressure increases above the pressure setting. The gas discharge valve will automatically open once the casing pressure increases. The lift pressure adjustment R84 defines the operating pressure required to lift maximum differential. Push button switches S15, S16, S17, S18 and S19 are operable to display on the liquid crystal display 152 casing bleed pressure, lift p.s.i., maximum differential pressure, minimum differential pressure, and maximum safe liquid discharge pressure, respectively.

Toggle switch S2 on the differential control panel is operable to select 5 minute and 10 minute interval ranges, respectively. Selector switch S5 is operable to select plunger up time, and selector switch S6 is operable to select plunger down time.

The liquid crystal display 152 is provided with a number of dot indicators for indicating system operating status. The black dot located at the lower left side of the LCD 152 indicates the system is in the plunger "uptime" period, and the black dot located at the lower right of the LCD indicates the system is in the plunger "downtime" period. The three vertical black dots at the center of the LCD 152 flash on and off, indicating when the manual/automatic switch S3 is in the manual position. Digits flashing on and off during any digital reading indicate the battery voltate is low.

If the up time dot and down time dot are ON, this indicates that the plunger tried to cycle, did not make it and is now in down time. If the up time dot is ON and the gas and oil discharge valves are closed, this indicates that the panel is shut in to increase the casing pressure to override the differential and drive the high differential to the MAX. DIFF. setting. The unit will then open the fluid discharge valve and allow the plunger to cycle.

ELECTRICAL INPUT CIRCUITRY

Figure 3:
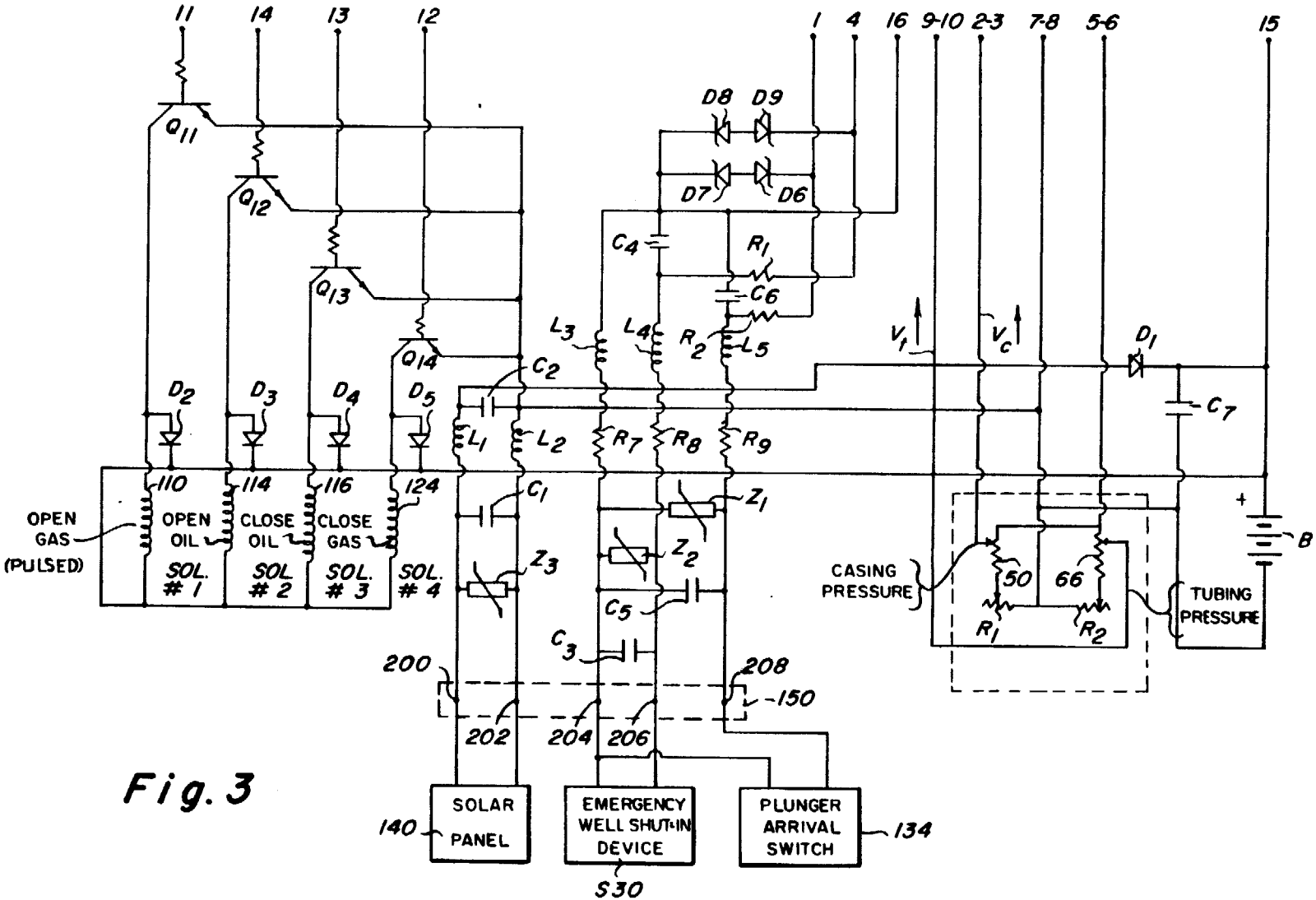
FIG. 3 is an electrical diagram of the solenoid driving circuitry for operating the pneumatic system of FIG. 1.
Figure 4A:
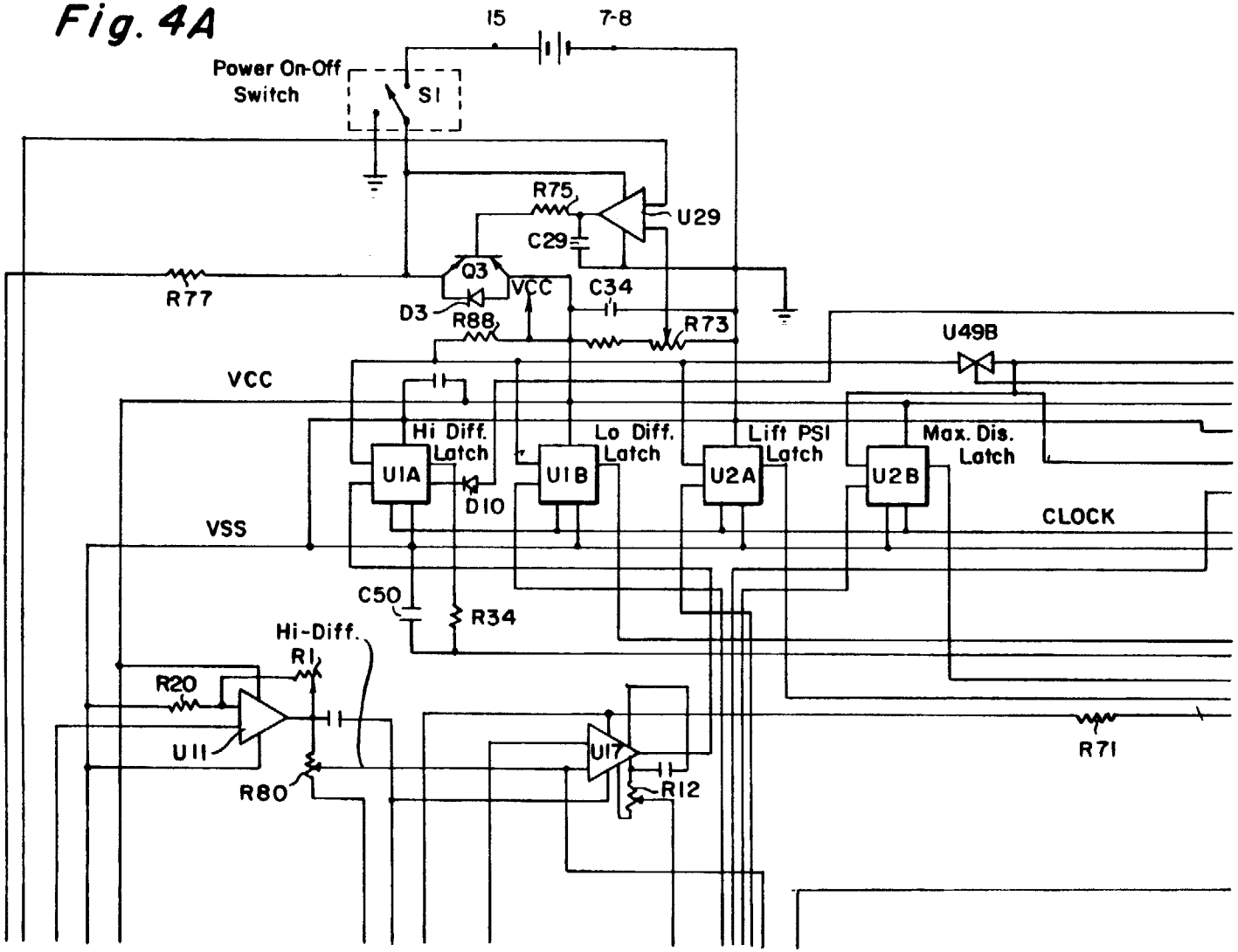
FIGS. 4A–4D may be joined to define an electrical circuit diagram of the differential control apparatus of the present invention.
Figure 4B:
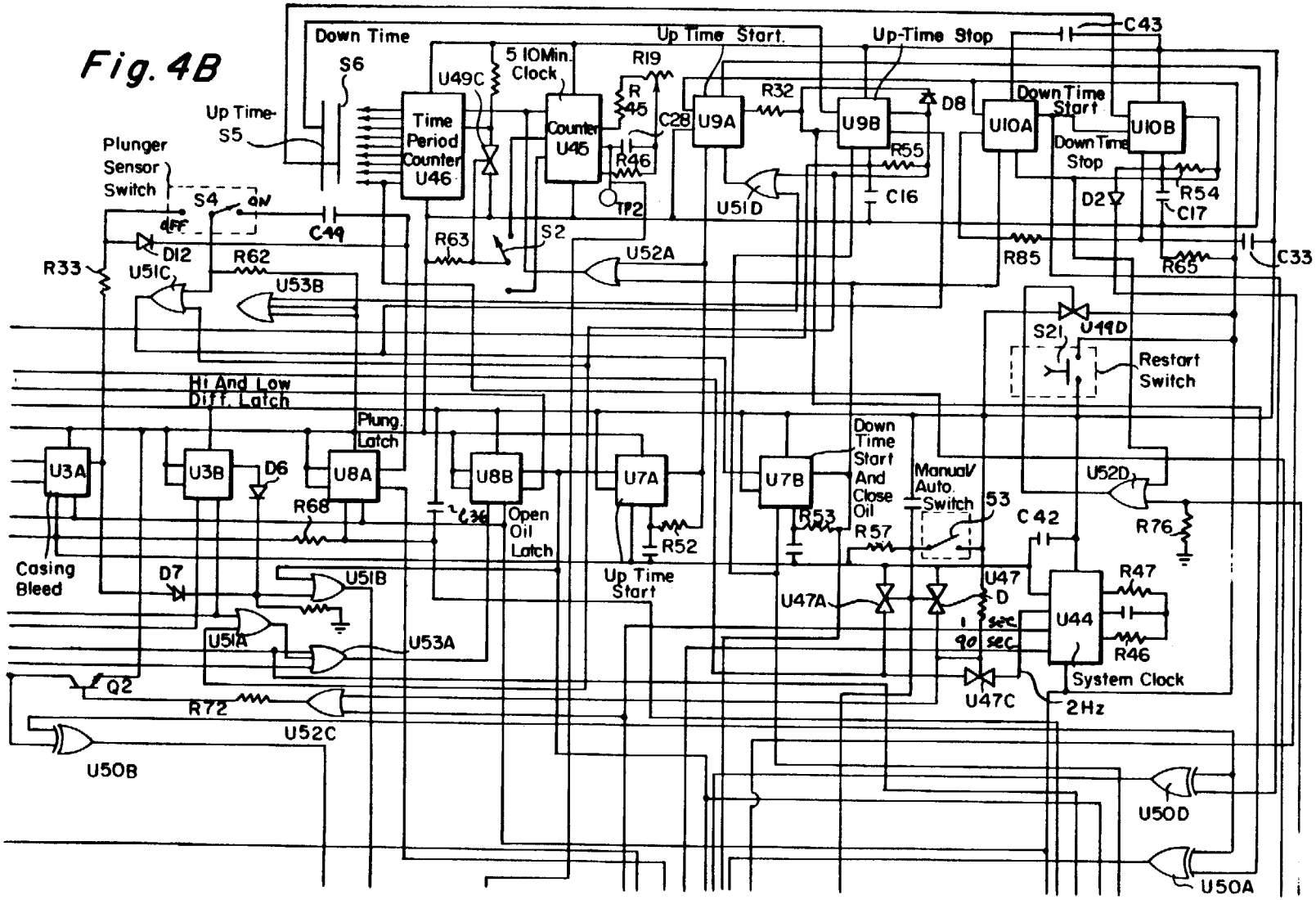
Figure 4C:
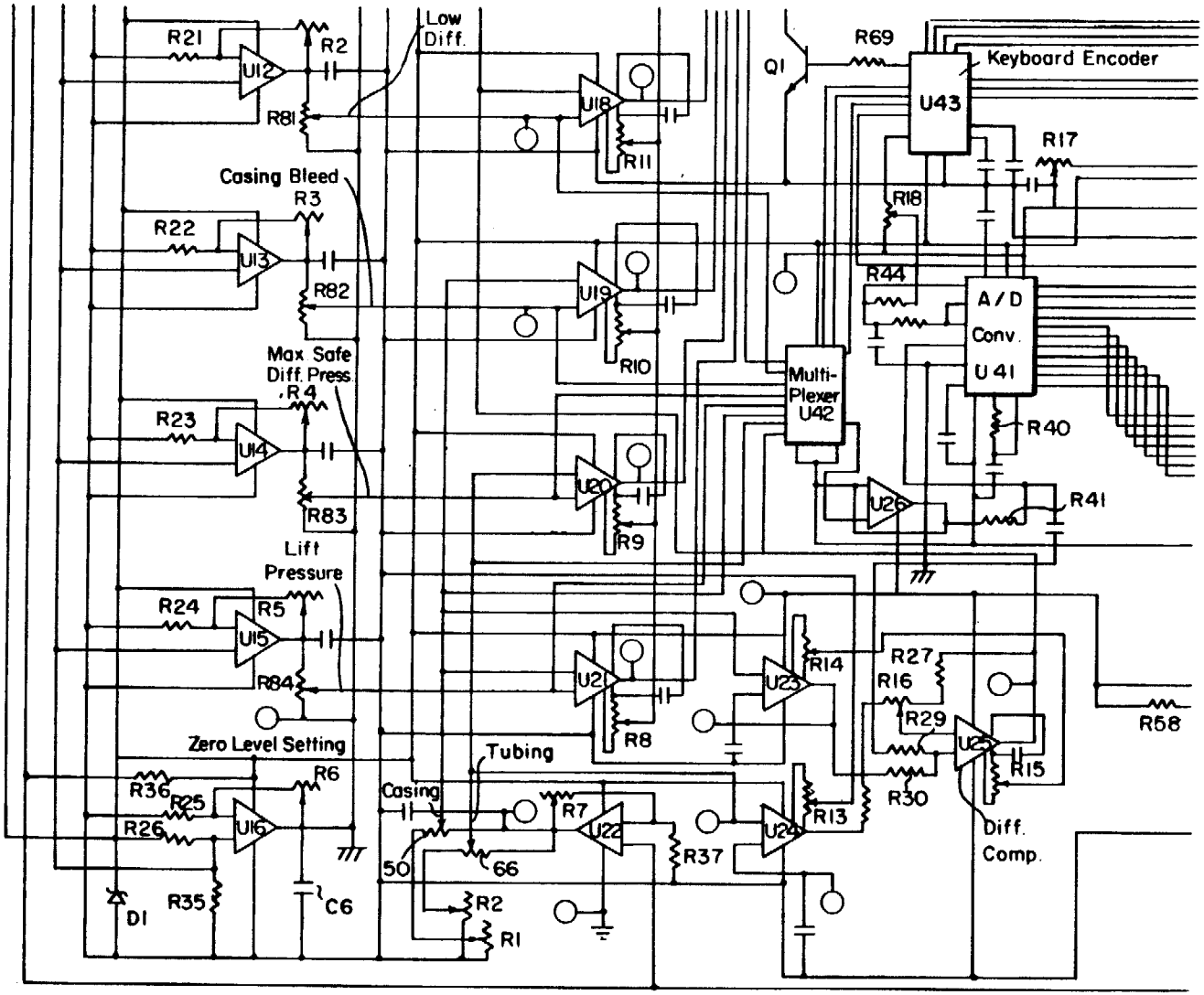
Figure 4D:
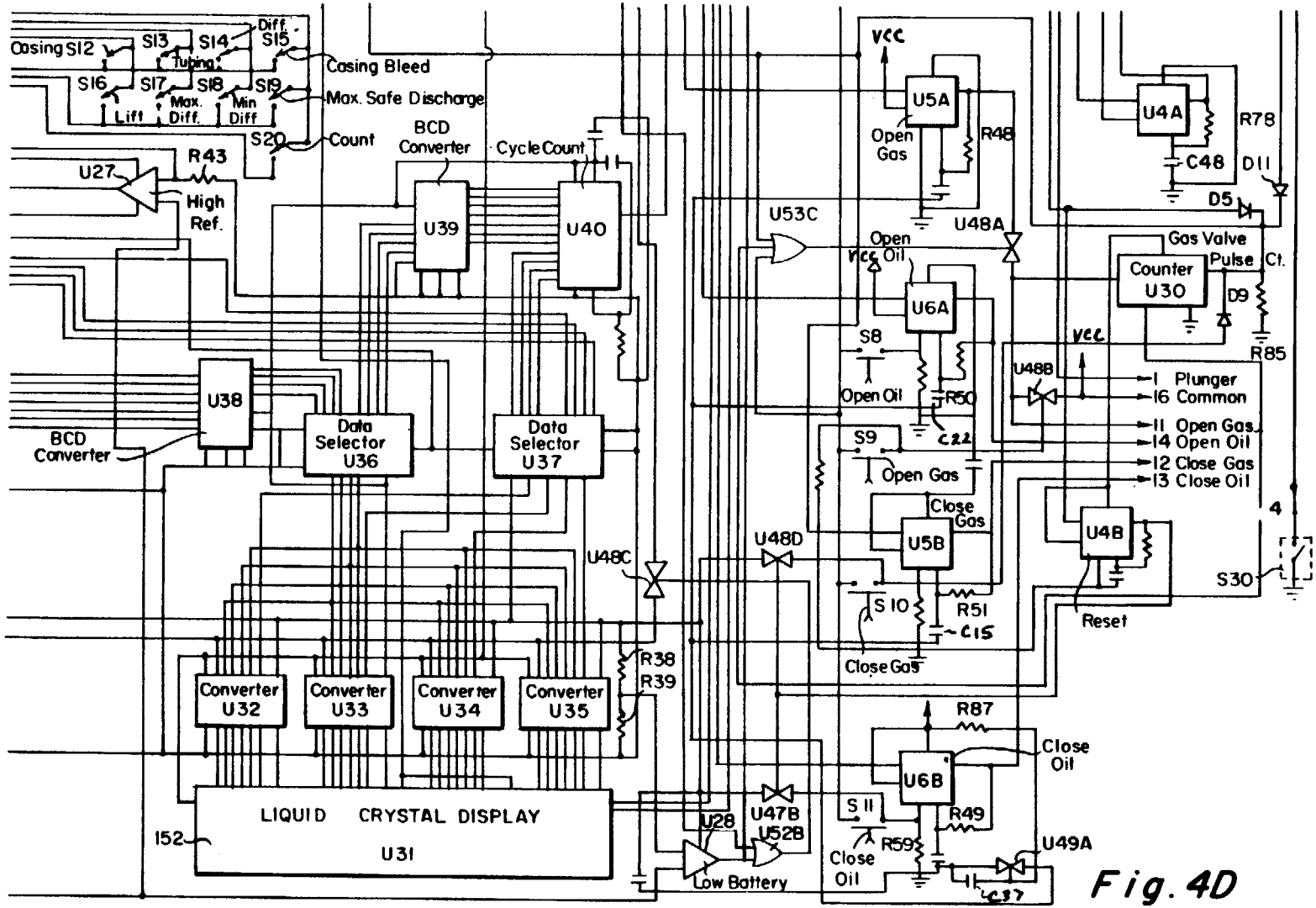

Referring now to FIG. 3, the input terminals 200 and 202 of terminal strip 150 are connected with the positive and negative terminals of battery B via a filter circuit including inductances $L_1$, $L_2$, capacitors $C_1$, $C_2$, $C_7$, varistor $Z_3$, and blocking diode $D_1$. The negative terminal is also connected with the emitter electrodes of solenoid transistor drivers $Q_{11}$, $Q_{12}$, $Q_{13}$, and $Q_{14}$ that drive the normally de-energized solenoid valves 110, 114, 116 and 124, as controlled by the control signals applied to the control electrodes via output terminals 11, 14, 13 and 12 from the differential control circuit of FIG. 4, as will be described in greater detail below. The casing pressure signal Vc from sensor 50 and the tubing pressure sensor signal Vt from sensor 66 are supplied to input terminals 2-3 and 9-10 of the differential control circuit, respectively. The filtered signal from plunger arrival switch 134 is applied across terminals 1 and 16, and the filtered emergency shut-in signal is applied across terminals 4 and 16.

DIFFERENTIAL CONTROL SYSTEM CIRCUITRY POWER SUPPLY

Referring now to FIG. 4, the positive supply voltage (VCC) is connected through the power on/off switch S1 and transistor Q3, which regulates the VCC supply buss. Q3 is controlled by regulator U29 which is adjusted by R73 for the output of Q3 to be 6-volts±0.010 volts. C34 is connected across the (VCC) and (VSS) buss for filtering and stabilization.

The negative ground supply (VSS) is connected directly to the ground buss which is switched to the (VCC) supply buss when switch S1 is in the "off" position via diode D3, causing the (VCC) buss to be pulled to ground. This insures that all "one-shot" circuits of the system are not triggered when the power is turned off.

Resistor R77 supplies positive voltage to reference diode D1 to insure that regulator U29 will turn on voltage regulator Q3 when the system power is turned on.

Operational amplifier U28 and voltage divider R38 and R39 sense a low battery voltage condition. U28 compares the voltage of the divider and the system reference voltage to determine when the battery reaches a low of 5.5 volts. The output of U28 drives one input of "OR" gate U52B. The other input of U52B is controlled by a one second clock pulse from the system clock U44. The output of U52B is applied to blanking control IC switch U48C. Switch U48C is turned on and off at a one second rate when an operator is taking a p.s.i. reading and the battery is at 5.5 volts or lower, causing the LCD reading to flash on and off.

The output of U28 is also connected through blocking diode D2 to the rest input of "one-shot" U10B. This input prevents U10B from being reset after a "downtime" period, and holds the rest line of the system high, preventing any further automatic cycling of the system until the low battery condition returns to above 5.5 volts.

CASING AND TUBING SIGNAL COMPARISON

In accordance with the present invention, the casing pressure signal Vc and the tubing pressure signal Vt from the sensors 50 and 66, respectively, are applied to the inputs of differential comparator U25. More particularly, the high end of the sensor potentiometer branch is connected with a stable voltage reference source U22 that is adjusted for an output voltage of 2.7 volts±0.025 volts by R7. The variable voltage on the wiper of these sensor potentiometers is the source input voltage to the analog circuitry. The output of the sensors equates to approximately 2 MV per 1 p.s.i. input pressure to the sensors. The sensors have an input range of 0 to 1000 p.s.i.

Reference diode D1 and operational amplifier U16 produce a stable reference voltage used to null the analog system zero pressure voltage with the zero pressure output voltage of the sensors 50 and 66. The null adjustment is made with R6. Diode D1 also provides a reference voltage to operational amplifiers U22, U27, U28, U11-U16, and voltage regulator U29.

Operational amplifiers U17-U21 are voltage comparators which compare the output voltages of the pressure sensors 50 and 66 (or the differential therebetween) with the face panel pressure set controls R80-R84. These panel controls are designated as follows:

R80—HIGH Differential Set
R81—LOW Differential Set
R82—Casing Bleed Set
R83—Maximum Discharge Pressure Set
R84—Lift Pressure Set

R12 through R8 are offset voltage adjustments for U17 through U21, respectively. Operational amplifiers U11-U15 provide a stable and adjustable reference voltage for panel controls R80-R84. R1-R5 adjustment controls, respectively, are used to set the upper pressure limit of the face panel controls R80-R84. With controls R80-R84 set full clockwise, R1-R5 are each adjusted to read 1000 on the face panel LCD 152. Operational amplifiers U23 and U24 are voltage followers that buffer the outputs Vc and Vt of the pressure sensors 50 and 66, respectively, from the low impedance inputs of U25. R14 and R13 are offset voltage adjustments for U23 and U24. Operational amplifier U25 is a voltage differential comparator that compares the output voltage of sensors 50 and 66. Considering the tubing sensor output Vt will always be equal to, or lower than, the casing sensor output Vc, then the output of U25 will be the voltage difference between the two sensors, which equates to the pressure difference of the casing and tubing of the well. R16 provides a trim adjustment for the balanced input to operational amplifier U25, and R15 provides the offset voltage adjustment. The output of U25 is compared with the HIGH and LOW differential settings of R80 and R81 by comparators U17 and U18.

READ OUT

U1A, U1B, U2A, U2B and U3A are flip-flops that latch the output state of comparators U17, U18, U21, U20 and U19, respectively. The Q output is latched low on the rising edge of the 2 HZ system clock generated by binary counter U44 when the "D" input from a comparator is low. All latches are reset by the systems reset line. The reset line is made high to reset the system either by operation of face panel restart switch S21 which applies (VCC) to the reset line, or automatically on "power up" from VCC via C33, R85, and U10B.

"OR" gate U52D is controlled by the Q output of "one-shot" U10B, which triggers on "power up" or the end of a "downtime" period set by face panel "downtime" rotary switch S6, or by override input from switch S30 to the face panel input terminals 3 and 4, designated "Emergency Well Shut In". The output of U52D turns on IC switch U49D which applies (VCC) to the reset line.

U42 is an 8-channel multiplexer which routes one of eight voltages to the input of A/D convertor U41. These analog voltages are obtained from the following points:

High Differential Set (R80)
Low Differential Set (R81)
Casing Bleed Set (R82)
Maximum Discharge Pressure Set (R83)
Lift Pressure Set (R84)
Casing Pressure (Output of casing sensor 50)
Tubing Pressure (Output of tubing sensor 66)
Differential Pressure (Output of differential amplifier comparator U25)

Multiplexer U42 is controlled by keyboard encoder U43 that in turn is controlled by face panel pushbutton switches S12–S20. U43 also generates the blanking signal via Q1 and IC switch U48C for convertors U32–U35. The output of multiplexer U42 is buffered by operational amplifier U26 and applied to the input of A/D convertor U41. The voltage offset adjustment for U41 is made by R18. The reference voltage source for analog to digital convertor U41 is provided by operational amplifier U27. The voltage output of U27 is adjusted by R17 and is adjusted for a display of 1000 on LCD 152 (U31) when 1000 p.s.i. is applied to the pressure sensors.

The output of U41 is in a multiplexed 7 segment form. The 7 segment outputs are applied to 7 segment to BCD convertor U38. The digit select outputs of convertor U41 are applied to data selector U37, and the output of the BCD convertor U38 is applied to data selector U36. The BCD output of U36 and the digit select output signals of U37 are applied to convertors U32–U35 associated with the liquid crystal display.

U32–U35 are BCD to 7 segment convertors, U32 being the M.S.D. and U35 being the L.S.D. The 7 segment outputs of U32–U35 are applied to the four 7 segment inputs of LCD 152 (U31). The phase signal for U31–U35 is derived from 5 to 10 minute clock U45. The blanking signal for U32–U35 is derived from keyboard encoder U43.

LCD 152 displays in digital form, the voltages applied to multiplexer U42. The display is read in pressure p.s.i. LCD 152 also displays the system cycle count from counter U40.

A 4-digit decade counter U40 is provided that counts each time plunger latch U8A is triggered by an override contact closure input to the face panel input terminals 5 and 6, designated "plunger sensor". U40 is automatically reset on "power up" by C32 and R70.

The 7 segment outputs of counter U40 are applied to the inputs of 7 segment to BCD convertor U39, and the digit select outputs of U40 are applied to the inputs of data selector U37. The outputs of convertor U39 are applied to the inputs of data selector U36. Data selectors U36 and U37 select the U40 counter data when the select line of U36 and U37 is signaled by key encoder U43 that the cycle count push-button S20 on the face panel has been operated. U36 and U37 drives U32–35.

SYSTEM CLOCK

A 14 bit binary counter U44 generates 3 clock signals for the system—namely, 2 HZ, 1 second and 90 second. The 2 HZ clock is used to latch and unlatch comparator latches U1A, U1B, U2A, U2B and U3a. The 2 HZ clock line is turned off by U47D and U47C and pulled to (VSS) by U47A whenever the face panel auto-manual switch S3 is in the manual position. This prevents the comparator latches from changing state while the system is in the manual mode of operation.

IC switch U47D prevents U47C and U47A from being in the "on" state at the same time, and provides a signal to an input of "OR" gate U52C when the auto/-manual switch S3 is in the manual position. The other input of "OR" gate U52C is connected to the system's one second clock line. The output of U52C is connected via invertor Q2, to an input of "EX" "OR" gate U50B. The other input to U50B is connected to the system's display phase signal generated by 5–10 minute clock U45. The output of U50B causes the three center vertical dots of LCD U31 to flash on and off at a one second rate when the auto/manual switch S3 is in the manual mode. The one second clock is used to generate the one second on and off flashing of LCD 152 (U31).

The 90 second clock is used to trigger open gas one-shot generator U5A, which generates "open gas discharge" valve pulses.

Fourteen bit binary counter U45 generates a 5 and 10 minute time base which is applied to face panel time period switch S2. The time base generator is set for 27 HZ at TP2 by adjusting R19. The 27 HZ signal is also used for the system display phase signal.

The 5 and 10 minute time base output of U45 is selected by period switch S2 and inverted by U49C. The output of U49C is applied to the input of time period decade counter U46. The decade counter U46 outputs nine 5 and 10 minute sequential time periods depending on the position of period switch S2. The time periods generated by U46 are applied to the nine positions of face panel "uptime" switch S5 and "downtime" switch S6. The pole output of these switches can be set to output 5 minute to 45 minute time periods, or 10 minute to 90 minute time periods, depending on the setting of period switch S2.

UPTIME AND DOWNTIME OPERATION

Five-10 minute clock U45 and counter U46 run continuously, and are reset at the beginning of a time period start pulse generated by "uptime" start one-shot U7A, or "downtime" start one-shot U7B. The Q outputs of U7A and U7B are applied to "OR" gate U52A. The outpu of "OR" gate U52A is applied to the reset inputs of U45 and U46.

The Q output of "uptime" one-shot U7A is also applied to the "uptime" enable latch U9A set input. When latch U9A is toggled, the Q output changes state which is applied to the "D" input of "uptime" inhibit one-shot U9B.

The "D" input conditions U9B to toggle on a clock pulse from the face panel "uptime" switch S5, ending the time period. The Q output of U9B via "OR" gate U51D resets "uptime" latch U9A at the end of a selected time period and generates a "downtime" sequence by clocking "downtime" one-shot U7B via "OR" gate U51C. One-shot U7B initiates a "downtime" period and closes the fluid discharge valve 38 via one-shot U6B.

The Q output of U9B also provides an input to "OR" gate U51A which inhibits the fluid discharge valve from opening when the following conditions exist.

Assume that all input conditions to the control system are correct and the system is in an "uptime" mode and the fluid discharge valve is open. The plunger in the well tubing is on its way to the surface and fluid is being expelled from the well.

Also, assume that when the "uptime" sequence was intiated the system differential input was above the high differential setting of R80 on the control panel. This condition would cause the $\overline{Q}$ output of the high differential latch U1A to be low. This output via diode D10 is applied to the reset input of one-shot U9B preventing U9B from resetting after being toggled by a clock pulse from "uptime" period switch S5, should the "uptime" period elapse before the plunger reaches the surface and initiates a "downtime" sequence.

One-shot U9B is now latched with the Q output high. One-shot U9B will remain latched and prevent the system from opening the fluid discharge valve 38 until the differential input to the system falls below the high differential setting of R80 on the control panel. When this occurs, the $\overline{Q}$ output of latch U1A reverse biases diode D10 allowing "one-shot" U9B to reset which removes the high input to "OR" gate U51A, and the system is now back to a normal operating condition.

The above described circuit arrangement allows the system to attempt to cycle the plunger to surface even though the input differential to the system is above the high differential setting of R80 on the control panel.

If the input differential to the system is not so excessive as to prevent the plunger 14 from reaching the surface and triggering plunger latch U8A via arrival switch 134 before the "uptime" period elapses, then the system continues to cycle as normal.

If the input differential to the system is so great as to not allow the plunger to reach the surface before the "uptime" period elapses, then the system is latched into high differential "lockout" condition as described above and will remain in this "lockout" mode until the input differential falls below the high differential setting of R80 on the control panel. When this occurs, the system will return to normal operation allowing one-shot U9B to reset which removes the inhibit from "OR" gate U51A.

The Q output of "uptime" latch U9A is also applied to an input to "EX" "OR" gate U50A. The other input to U50A is controlled by the system phase signal from generator U45.

The output of U50A is applied to the lower left black dot of LCD 152 which indicates that the system is in an "uptime" period mode, or in a "high" differential "lockout" condition. When the system is in a "high" differential "lockout" mode, the "uptime" dot is held on by the Q output of one-shot U9B via diode D8. Diode D8 also holds the D input of U9B high, preventing it from changing state by clock pulses from "uptime" period switch S5.

The Q output of "downtime start" one-shot U7B is also applied to "downtime enable" latch U10A set input and to the clock input of "close fluid discharge valve" one-shot U6B which generates a signal to close the fluid discharge valve. Latch U10A is toggled and the Q output changes state which is applied to the "D" input of "downtime" inhibit one-shot U10B. The "D" input conditions U10B to toggle on a clock pulse from the face panel "downtime" switch S6, ending the time period. The Q output from U10B resets "downtime" latch U10A and resets the system via "OR" gate U52D and IC switch 49D.

The Q output of latch U10A is also applied to an input to "EX" "OR" gate U50D. The other input to U50D is controlled by the system phase signal from generator U45. The output of U50D is applied to the lower right back dot of LCD 152 which indicates the system is in a "downtime" mode.

The "uptime" latch U9A and the "downtime" latch U10A are reset automatically by their clock inputs from the system reset line when the face panel "restart" switch S21 is activated.

SOLENOID DRIVERS

The one-shot devices U5A, U5B, U6A and U6B operate the solenoid drivers Q11–Q14 of FIG. 3 as follows. One-shot U5A drives Q11 to energize solenoid #1 via switch U48A, thereby to open gas valve 26. U5B drives Q14 to energize solenoid V4, thereby to close the gas valve 26. One-shot U6A drives Q12 to operate solenoid #2 to open fluid vlave 38, and one-shot U6B drives Q13 to operate solenoid V3, thereby to close the fluid valve 38. Open gas one-shot U5A is continuously triggered by the 90 second clock line from system clock U44, whereby the 1 second output pulse of one-shot U5A is applied every 90 seconds through IC switch U48A to the clock input of counter U30 and to solenoid driver Q11 and solenoid V1.

Thus, in accordance with an important feature of the present invention, the 1 second pulses supplied at 90 second intervals to the "open" gas discharge valve solenoid V1 causes slow opening of the external diaphragm gas discharge valve 26. This prevents the gas from escaping too fast from the well tubing, thus preventing the plunger from rising in the tubing prematurely without a fluid load.

Pulse counter U30 is clocked by the 90 second clock pulse at the output of U48A. Counter U30 counts 16 pulses and outputs a signal to inhibit "NOR" gate U53C. The output of U53C controls the on/off state of IC switch U48A.

When a count of 16 is reached by counter U30, its output via "NOR" gate U53C causes IC switch U48A to open. This inhibits the 90 second pulses from U5A from reaching the clock input to counter U30 and to the solenoid driver Q11. Pulse counter U30 is reset by either the system reset line via diode D5, the output of close gas discharge valve "OR" gate U51B via diode D4, the output of close gas discharge valve switch S10 via diode D9 when activated manually, or the output of counter U46 via diode D11. This reset input allows counter U30 to remove the inhibit signal from the input of "NOR" gate U53C, allowing the gas discharge valve to be repulsed open periodically to insure that the gas valve will remain open for long periods of time.

One-shot U5B outputs a 15 second "close" gas discharge valve pulse to solenoid driver Q14 to energize solenoid #4 upon receiving a clock signal from "OR" gate U51B. The 15 second pulse to solenoid #4 allows sufficient time for the external diaphragm gas discharge valve 26 to fully close.

One-shot U6A outputs a 1 second "open" fluid discharge valve pulse to solenoid driver Q12 to energize solenoid #2 upon receiving a clock signal from latch U8B, and one-shot U6B outputs a 1 second "close" fluid valve discharge pulse to solenoid driver Q13 to energize solenoid #3 upon receiving a clock signal from one-shot U7B.

AUTOMATIC/MANUAL SELECTOR SWITCH

All face panel open/close valve control push-button switches are activated by the face panel auto/manual selector switch S3. When switch S3 is placed in the manual position, power supply voltage (VCC) is connected with one pole of switches S8–S11. (VCC) is also applied to an input of "NOR" gate U53C, and the output of U53C turns IC switch U48A off. This inhibits the 90 second output pulses of U5A from reaching the clock input of counter U30 and "open" gas discharge valve solenoid V1.

Close gas one-shot U5B, open oil one-shot U6A and close fluid one-shot U6B are triggered manually by the actuation of face panel push-button switches S10 (close gas discharge valve), S8 (open fluid discharge valve) and S11 (close fluid discharge valve), respectively, by applying an input signal to their set inputs when auto/-manual selector switch S3 is in the manual position.

The "open" gas valve face panel switch S9 turns on IC switch U48B. U48B applies power supply voltage (VCC) directly to the open gas valve drive Q11 and solenoid V1. This allows the gas valve to be opened with a continuous open signal, rather than by a pulsed signal as is done in the automatic mode of operation. IC switch U49A disconnects the system ground (VSS) from capacitors C15, C22 and C23 on system power up. This prevents the gas discharge valve and the fluid discharge valve from opening falsely. The turn on of U49A is delayed by C37 and R87 when the system is powered up.

One-shots U5B and U6B are triggered by the reset line on power up, as will be explained below. This also insures that the gas discharge and fluid discharge valves are closed on power up.

EMERGENCY WELL SHUT-IN

Closure of the contacts of switch S30 causes the system to close both the fluid discharge valve 38 and the gas discharge valve 26, and holds the system in the reset condition. The signal is filtered by C3, C4, L3 and L4 (FIG. 3), and transient protected by Z2, D8, and D9. This input is connected to power supply voltage (VCC), and to an input of "OR" gate U52D and R76.

The output of "OR" gate U52D turns on IC switch U49D, which applies (VCC) to the system reset line. The system is held in a reset condition until the short across TS1 terminals 3 and 4 is removed. Upon removal of this short, the system will return to a normal operating condition. One-shot U4B is triggered by the reset line when it goes high. The output of U4B is applied to IC switches U47B and U48D. U47B turns on and applies a pulse to the set input of one-shot U6B which generates a "close" fluid valve discharge valve signal. U48D turns on and applies to the set input of one-shot U5B which generates a "close" gas discharge valve signal.

PLUNGER ARRIVAL SWITCH

When the plunger 14 rises in the tubing to a height to operate plunger arrival switch 134, fluid discharge valve 38 is closed and "downtime" sequence in the automatic operating cycle is initiated. As shown in FIG. 3, the input signal from switch 134 is filtered by C5, C6, L4 and L5 and is transient protected by Z1, D6 and D7. Supply voltage (VCC) is applied to the set input of "plunger latch" U8A, which latch is reset by an input from the system reset line initiated by "downtime" one-shot U10B. The $\overline{Q}$ output of latch U8A provides the clock pulse signal to cycle counter U40. The Q output of U8A is applied to "OR" gate U51C via capacitor C49 and the normally "on" position contact of the face panel "plunger sensor" switch S4. The output of "OR" gate U51C is applied to the clock input of one-shot U7B and an input to "OR" gate U51D. "OR" gate U51D resets "uptime" latch U9A. The Q output of one-shot U7B initiates a system "downtime" mode by applying a signal to the set input of "downtime" latch U10A and to "OR" gate U52A, "OR" gate U52A resets counter U45 and U46. The Q output of U7B also triggers one-shot U6B which generates a close fluid discharge valve signal.

Should the plunger fail to reach the surface and trigger latch U8A before the "uptime" period ends, the "OR" gate U51C is triggered by the Q output of one-shot U9B at the end of the "uptime" period and "OR" gate U51C initiates a "downtime" sequence as explained above.

When the plunger sensor switch S4 is in the "off" position the Q output of "casing bleed latch" U3A is connected to "OR" gate U51C via R33 and switch S4, and the Q output of "plunger sensor" U8A is disconnected from "OR" gate U51C.

The input to "OR" gate U51C is pulled "low" by diode D12 until the plunger arrives at the surface and triggers the Q output of plunger latch U8A. This reverse biases diode D12 and allows the Q output of the "casing bleed" latch U3A to become effective as an input to "OR" gate U51C. "OR" gate U51C will not generate an output until either the Q output of "casing bleed" latch U3A goes high, or a high input to "OR" gate U51C is generated by one-shot U9B at the end of the "uptime" period.

In either event, when the output of "OR" gate U51C goes high, a "downtime" period sequence is initiated and the fluid discharge valve closes.

COMPARATOR LATCHES

The Q outputs from comparator latches U1A, U1B, U2A, U2B and U3A provide the logic information to the decision making logic block consisting of open/-close gas discharge the valve (high-low differential) condition latch U3B, "OR" gates U51A and U51B, "NOR" gate U53A, open fluid discharge valve latch U8B, and close fluid discharge latch one-shot U4A.

The Q output state of high-low differential "condition" latch U3B determines whether the gas discharge valve 26 will be opened or closed. A "low" output allows the gas discharge valve to open, a "high" output causes the gas discharge valve to close.

The set and reset inputs of latch U3B monitor the output state of differential comparator latches U1A and U1B, respectively. When the system is reset starting a new cycle, the Q outputs of comparator latches U1A and U1B go high, thus the set and reset inputs of latch U3B are forced high causing the Q output of U3B to go high keeping the gas discharge valve closed.

The next step in the cycle sequence is determined by the output state of comparators U17 and U18.

The outputs of comparators U17 and U18 control the Q output state of differential latches U1A and U1B respectively.

The Q output of latches U1A and U1B determine the logic state of the set and reset inputs of condition latch U3B, therefore, following a reset condition, there are three (3) logical states that can be applied to the set and reset inputs of condition latch U3B, namely:

(a) Set=Low; Reset=High This logic state forces the Q output of U3B low thus allowing the gas discharge valve 26 to open.

(b) Set=Low; Reset=Low This logic state does not change the Q output of U3B from high to low because the set input is delayed by R34 and C50, causing the set input to go low after the reset input goes low. The Q output stays high and the gas discharge valve remains closed.

(c) Set=High; Reset=Low This logic state does not change the Q output of U3B from high to low because the set input remains high after the reset goes low. The Q output stays high and the gas discharge valve remains closed.

It can be seen from the above that the gas discharge valve cannot open unless the reset input of U3B is made high during a period when the set input is low. This condition exists only following a system cycle reset and the differential input to the system is lower than the low differential set point made on the control panel by R81 (low differential set control). When the differential input exceeds the low differential set point, the outputs of U18 and latch U1B go low, thus making the reset of U3B low. However, the Q output of U3B remains low, allowing the gas discharge valve to remain open, unless a logic override controlled by lift latch U2A, or bleed latch U3A calls for a closure of the gas discharge valve.

The Q output of U3B will remain low until such time that the differential input to the system exceeds the high differential set point made on the control panel by R80 (high differential set control). When this occurs, the output of U17 and latch U1A go high and the set input of U3B is made high forcing the Q output of U3B high, causing the gas discharge valve to close.

This condition will remain until a logic override by lift latch U2A initiates an open fluid valve sequence.

If this condition continues for a long period of time, the differential input to the system will eventually begin to fall. When this differential input passes below the "high" differential set point of R80 the set input to U3B will return to a low state and the Q output will remain high.

When the differential input to the system falls below the "low" differential set point of R81, the reset input to U3B is made high, forcing the Q output of U3B low, allowing the gas discharge valve 26 to reopen.

This sequence will continue until such time that a logic override from lift latch U2A occurs, initiating a "uptime" sequence to open the fluid discharge valve and close the gas discharge valve, should it be open.

The Q output of condition latch U3B is applied to an input of "OR" gate U51B via diode D6. The Q output of "casing bleed" latch U3A is also applied to this input via diode D7. "Casing bleed" latch U3A is controlled by the output of comparator U19 which monitors the casing pressure of the well. Should the casing pressure be below or fall below the "casing bleed" control setting of R82 on the face panel, then the output of comparator U19 will go high, causing the Q output of casing bleed latch U3A to go high. The Q output of U3A is applied via diode D7 to an input to "OR" gate U51B. The output of gate U51B initiates the closure of the gas discharge valve 26, as discussed above.

When the casing pressure rises above the setting of face panel control R82, then the inhibit input to "OR" gate U51B is removed.

The other input to "OR" gate U51B is connected to the Q output of fluid discharge valve latch U8B.

The output state of "OR" gate U51B causes the gas discharge valve to open or close. When the output of "OR" gate U51B goes "high" the following sequence is initiated:

(a) One-shot U5B closes the gas dischage valve.

(b) Pulse counter U30 is reset and held reset.

(c) The output of "NOR" gate U53C inhibits IC switch U48A, preventing the gas discharge valve from being pulsed open by one-shot U5A.

When the output of U51B goes "low" the following sequence is initiated:

(a) The inhibit input is removed from "NOR" gate U53C which allows IC switch U48A to turn on, allowing "open" gas discharge valve pulses to reach counter U30 and solenoid driver Q1, causing the gas discharge valve to open.

(b) The rest signal is removed from counter U30 allowing it to count the open gas discharge valve pulses. When a count of sixteen is reached by counter U30, the output goes high providing an inhibit to "NOR" gate U53C. The output of gate U53C turns off IC switch U48A preventing further pulses from reaching counter U30 and solenoid driver Q11.

"OR" gate U51A prevents the fluid discharge valve from opening if the system input differential is lower than the low different set point of R81 on the control panel, or if the Q output of one-shot U9B is latched in a "high differential lockout" state by the $\overline{Q}$ output of "high" differential comparator latch U1A.

The inputs to "OR" gate U51A monitor the low differential latch U1B output and the output from the "uptime" inhibit one-shot U9B. If either of these inputs go high, the output of U51A will go high providing an inhibit input to "NOR" gate U53A, preventing the output of "NOR" gate U53A from initiating an "open" fluid discharge valve sequence.

"NOR" gate U53A also monitors the output states of lift latch U2A and max. discharge latch U2B.

The Q output of lift latch U2A inhibits the output of "NOR" gate U53A from going high should the input casing pressure voltage appearing at the input of comparator U21 be lower than the lift pressure set point of face panel control R84. When the casing pressure input voltage exceeds the pressure setting of R84, then the "D" input to latch U2A is made low and the Q output will go low on the next system clock pulse removing the inhibit to "NOR" gate U53A.

The Q output of max. discharge latch U2B inhibits the output of "NOR" gate U53A from going high should the input tubing pressure voltage appearing at the input of comparator U20 exceed the max. discharge pressure set point of face panel control R83. If the input tubing pressure voltage is lower than the setting of R83, the "D" input to latch U2B will be low and the Q output will go low on the next system clock pulse removing the inhibit to "NOR" gate U53A.

The output of "NOR" gate U53A goes high when the casing pressure and tubing pressure input voltages are at a proper value relative to the set points of the face panel control settings which allow all inputs of "NOR" gate U53A to go low.

The output of "NOR" gate U53A is applied to the set input of fluid discharge latch U8B. When the set input of U8B is forced high by the output of "NOR" gate U53A, the Q output of U8B goes high, and the $\overline{Q}$ goes low, causing the following sequence to take place:

(a) The $\overline{Q}$ output of U8B turns off IC switch U49B which removes the system clock input to latches U1A, U1B and U2A. This prevents these latches from changing state during the system's "uptime" and "downtime" sequence.

(b) The Q output of U8B initiates the following:

(1) Triggers "uptime" start one-shot U7A which reset clock U45 and counter U46 and sets "uptime" enable latch U9A.

(2) Inhibits "OR" gate U51B which inhibits "open gas discharge valve" pulses via U53C an U48A, resets pulse counter U30, and closes "gas discharge valve" via one-shot U5B.

(3) Triggers "open fluid discharge" valve one-shot U6A, and pulls the "D" input of "max. discharge" one-shot U4A high. This prepares U4A to trigger "downtime start" one-shot U7B which will initiate a "downtime" sequence and close the fluid discharge valve if the tubing pressure rises above the max. discharge setting of face panel control R83 during the discharge of fluid.

Fluid discharge latch U8B is reset by the system reset line when the system completes a cycle.

Max discharge latch U2B is controlled by the output state of comparator U20.

If the tubing pressure exceeds the max. discharge setting of control R83 on the face panel, the output of comparator U20 will go high causing the Q output of max. discharge latch U2B to go high. This signal is applied to an input of "NOR" gate U53A and the clock input of "max. discharge" one-shot U4A.

The high input to gate U53A prevents the output of U53A from going high and starting an "uptime" sequence and opening the fluid discharge valve.

If the tubing pressure should rise above the setting of control R83 after the "uptime" sequence has been initiated. then max. discharge one-shot U4A will be triggered which will trigger "downtime start" one-shot U7B initiates a "downtime" sequence and closing the fluid discharge valve.

When the system resets after the "downtime" period, and the tubing pressure is still above the max. discharge control setting of R83, the "max. discharge" latch U2B will inhibit "NOR" gate U53A preventing an "uptime" sequence from being initiated. This condition will remain until the "max. discharge" setting of panel control R83 is raised or some other measure is taken to lower the tubing pressure of the well.

However, should the differential input fall below the "low differential" setting of panel control R81, the system will initiate an "open" gas discharge valve sequence and allow gas to be discharged from the well.

OPERATION

In operation, the system monitors the pressure difference between casing pressure and tubing pressure for operating the well in accordance with settings made on the control panel 2 by the operator. Since the differential pressure is the controlling factor, then there must be fluid in the well before the system will respond and cycle the plunger to discharge fluid from the well. Consequently, production is based primarily on the speed and amount of fluid released from the producing formation into the well bore, rather than solely on time. The operator can easily obtain tubing and casing pressure readings by operating switches S12 and S13, respectively, whereby the operating status of the well may be interpreted. As will be set forth in greater detail below, gauges 86 and 106 indicate by pressure as to whether the gas and fluid valves are in open or closed conditions, respectively. Readings of zero and 30 p.s.i. on a given gauge indicate that the associated valve is closed and open, respectively. The operator has means for controlling the tubing and casing pressures so that the well will produce at its greatest efficiency and capability. When the proper operating pressures have been determined and the system adjusted accordingly, the system will operate automatically to maintain these operating pressures. Finally, the system provides safety overrides and controls than can be set by the operator for various conditions.

The line pressure of the the gas in discharge line 32 is a function of pipe line size, the number of wells feeding into the line, and the rate at which the gas is being used or stored.

Normally, the line pressure is controlled by pressure regulator means through which the gas from each serving well must pass. These regulators are adjusted to establish and maintain a desired operating pressure in the transmission line. Also, a check valve is installed at each connecting point along the transmission line where a well is tied into the system. The check valve allows gas to flow only from the well into the transmission line, and not from the line backwards toward the well.

When a well has enough formation pressure to overcome the existing line pressure, gas will feed into the transmission line. When enough gas has entered the transmission line to increase the line pressure to the regulator set point, the regulators shut off all supply gas coming from the wells feeding the transmission line. This will cause the formation pressure of the wells to increase, preventing oil from entering. Should this be the case, then it may be necessary to flare the gas to allow the oil to enter.

The amount of gas each well is allowed to feed into the transmission line is controlled by the use of a Back Pressure Regulator. By increasing the back pressure, the amount of oil entering the well will be decreased, and by decreasing the back pressure, more oil will be allowed to enter the well. By using a back pressure valve, sufficient well pressure to operate a plunger lift system properly can be maintained.

With power switch S1 turned on, switch S3 is operated to the manual position to permit adjustment of the gas supply pressure to the diaphragm operating means of the gas supply valve 26 and the fluid discharge valve 38, as indicated by the gauges 86 and 106, respectively. The regulators 74 and 78 are adjusted to produce readings on the gauges of a given amount (for example, a minimum of 30 p.s.i.). The speed adjustment needle valves 80 and 98 control the speed of opening and closing of the gas and fluid discharge valves 26 and 38, respectively. If either adjustment screw is rotated in the clockwise direction to a shut condition, the associated valve cannot be closed. By turning the adjustment screw in the counterclockwise direction, the speed of closing of the associated valve is progressively increased.

To set the desired operating ranges, the push button switches S15–S19 are selectively operated and the associated variable resistors are adjusted, respectively. More particularly, with switch S15 closed, casing bleed resistor R82 is adjusted to set the pressure to which the casing may drop when the gas discharge valve 26 is open. When the casing pressure drops below this setting, the gas discharge valve will close until the casing pressure builds up again, whereupon the gas discharge valve is again opened. The gas discharge valve will thus open and close until the desired differential is reached, and after the casing pressure builds up to "lift pressure", the fluid valve 38 will open to allow plunger 14 to cycle. Lift pressure (i.e., system operating pressure) is set by operating push button S16 and by adjusting variable resistor R84. This is the pressure required to lift the maximum fluid load set by the operator. Maximum fluid load, in turn, is set by operating push button switch S17 and by setting variable resistor R80. To set minimum differential (i.e., the smallest fluid load with which the plunger is permitted to cycle, thereby to prevent the plunger 14 from surfacing dry), push button switch S18 is operated and variable resistor R81 is adjusted as desired (normally on the order of 25 to 30 p.s.i.). To set the maximum safe operating pressure of the system, push button switch S19 is operated and variable resistor R83 is set to establish the maximum pressure which may be discharged into flow line 22B (for example, 500 p.s.i.). In this manner, rupture of the feedline and/or the oil tank is prevented.

Referring now to the lower portion of the operating panel 2, when the plunger sensor toggle switch S4 is placed in the off position, the oil discharge valve 38 will remain open after the plunger 14 cycles, either until the casing pressure has bled down to the casing bleed set point, or until the "uptime" setting has elapsed. This procedure is used for stripping the well, or in areas where the pressure of line 32 is so high that the formation is prevented from supplying oil. The differential control system returns to normal cycling even if the casing doesn't bleed down to the casing bleed setting of resistor R82. The set plunger uptime switch S5 is a safety override which is operable—in the event that the plunger 14 doesn't make it to the surface at the end of the uptime period—to revert the system to the "downtime" period and to recycle. The set plunger downtime switch S6 controls the time allowed for the plunger to drop from a point opposite arrival switch 134 to the bottom of the well (i.e., for a period of time that varies as a function of the depth of the well and the amount of liquid in the well).

Upon completion of the aforementioned settings, manual/automatic switch S3 is switched to the automatic position, and restart push button switch S21 is operated to initiate automatic system operation. Casing and tubing pressures may be read out on the LCD 152 by operating push button switches S12 and S13, respectively, and the difference between casing and tubing pressures—which is a function of the oil load inside the tubing 10—is displayed on LCD 152 by operation of push button switch S14. Count switch S20 determines the number of times the plunger has cycled within a given period. To reset the counter, power switch S1 is turned off and then on, whereupon the counter reads zero. Operation of restart push button switch S21 automatically starts the control system in the proper timing sequence. In an emergency, the restart button S21 is held in to close the gas and oil supply valves and to maintain the same in the closed condition until the push button switch is released.

Assume now that the gas and fluid valves 26 and 38 are in their initially closed condition, whereupon the well is in its shut-in condition with no movement of the gas or oil. Since there is little or no differential between casing and tubing pressure, the gas discharge valve 26 is gradually opened in 16 steps (owing to the supply of 16 one second pulses at 90 second intervals by the system clock U44 of FIG. 4). Every 90 seconds the valve will open a little more until it reaches its fully open condition. In this manner, a sudden surge of gas is prevented which might otherwise bring the plunger 14 to the surface in a dry condition. As gas is discharged for sale via gas leg 22a, gas/oil separator 24 and gas supply line 32, gas and oil are introduced in the tubing 10 via perforations 12, and oil begins to build up around and above the plunger 14, whereby the escape of gas to the surface is shut off, and the desired pressure differential between the tubing and the casing begins to be created. For example, when the gas dischage valve 26 is fully open to afford unrestricted flow of gas, casing pressure (as indicated on LCD 152 by operation of push button switch S12) would be 150 p.s.i., and tubing pressure (as indicated upon operation of push button switch S13) would by 100 p.s.i., thereby indicating that the pressure differential oil load on plunger 14 is 50 p.s.i. Assuming that 150 p.s.i. is lift pressure set by variable resistor R84, the oil discharge valve 38 is opened to allow plunger 14 to cycle to the surface, forcing to oil storage tank 34 via oil line 22b and adjustable choke valve 40 (which chokes back the flow of oil to the oil storage tank 34, and prevents the oil from flowing into the tank at a rate that would cause the oil to splash out of the tank, or possibly rupture the tank). The gas and oil supplied into the tubing below the plunger prevents the plunger from dropping back down in the well.

When the plunger 14 rises in the tubing to a point operating the plunger arrival switch 134, the fluid discharge valve 38 is closed, and the unit is now in the "downtime" mode. The downtime switch S6 is set for the time required for the plunger 14 to fall back down to the bottom through the oil. Thus, the greater the fluid and the deeper the well, the more time is required to allow the plunger to fall to the bottom. Thus, sufficient "downtime" must be established to permit both fall of the plunger to the bottom of the well, as well as time for the well formation pressure to increase.

After the established "downtime" has lapsed, the unit goes into the automatic sequence mode, and if the oil level is greater than minimum differential and the casing pressure is greater than lift pressure, the oil discharge valve 38 will open to again cycle the plunger. On the other hand, if the oil level is below the minimum differential setting and the casing pressure is above the casing bleed setting, the unit will automatically open the gas discharge valve 26 and sell gas until the preset minimum differential is reached. If the casing pressure is at least as great as "lift pressure" after the minimum differential setting is reached, the gas discharge valve 26 closes and the oil discharge valve 38 opens, thereby permitting the plunger to cycle. If the casing pressure is below lift pressure when minimum differential is reached, the gas dischage valve will remain open until "maximum differential" is reached. When the casing pressure increases to the lift pressure setting, the oil discharge valve 38 is opened regardless of whether or not the differential has risen above maximum differential. If minimum differential is not reached by the time the casing pressure decreases to the casing bleed setting, the gas discharge valve 26 will close. This procedure is repeated until the preset differential is reached.

If the differential is below minimum differential when the lift pressure is reached, the gas discharge valve 26 will reopen to attain the desired differential and the unit will cycle when lift pressure and the preset differential is reached.

After a plunger cycle, if the differential is above the "maximum differential" setting and the casing pressure is at least as great as the preset "lift pressure", the unit will open the fluid discharge vavle 38, and the "up time" dot on the LCD 152 will appear, whereupon the unit attempts to cycle the plunger. If the plunger doesn't make it to the surface, the "downtime" dot will come on. When both dots are on, an indication is presented that the plunger tried to cycle too much differential, and did not reach the surface. After the down time has elapsed, the up time dot will remain illuminated until the casing pressure increases enough to drive the high differential back down to the maximum differential setting, whereupon the plunger will cycle at this time.

PRODUCTION METHODS

In production, when the system is used in the bypass mode, the well fluid discharges to atmospheric pressure, or into the receptacle (such as a tank or pit). The following ratios are appropriate for a bypass system:

| LIFT PRESSURE | MAXIMUM DIFFERENTIAL |
|---|---|
| 100 | 30 |
| 150 | 50 |
| 200 | 100 |
| 250 | 125 |
| 300 | 150 |
| 350 | 175 |
| 400 | 200 |
| 450 | 225 |
| 500 | 250 |

When the system is operated in a second mode in which the well fluid is discharged directly into a separator, thereby cycling against the existing line pressure, the lift pressure required to lift a load is increased, and therefore line pressure must be added to the maximum differential pressure to determine the lift pressure required.

EXAMPLE NO. 1

| LIFT PRESSURE | MAX. DIFF. | MIN. DIFF. |
|---|---|---|
| 200 | 100 | 50 |

Assuming that the lift pressure is less than 200 and the differential is less than 50, at the end of the downtime mode the system senses low differential, whereupon the gas discharge valve 26 is opened in 16 steps (owing to the pulses from the system clock U44), thereby preventing the plunger from traveling dry. The gas and oil are fed into the tubing 10 until a differential of 100 is reached, whereupon the gas discharge valve 26 is closed. After the casing pressure builds up to the lift pressure setting, the oil discharge valve 38 opens, thereby permitting the plunger 14 to cycle.

EXAMPLE NO. 2

| LIFT PRESSURE | MAX. DIFF. | MIN. DIFF. |
|---|---|---|
| 200 | 100 | 50 |

Assuming that the lift pressure is 200 and the differential is between 50 and 100, after the downtime mode the oil discharge valve will open, thereby permitting the plunger to cycle.

EXAMPLE NO. 3

| LIFT PRESSURE | MAX. DIFF. | MIN. DIFF. |
|---|---|---|
| 200 | 100 | 50 |

Assuming that the lift pressure is below 200 and the differential is above 100, the gas discharge valve 26 stays closed until the casing pressure increases to the lift pressure setting, whereupon the fluid discharge valve 38 opens.

EXAMPLE NO. 4

| LIFT PRESSURE | MAX. DIFF. | MIN. DIFF. |
|---|---|---|
| 200 | 100 | 50 |

Assuming now that lift pressure is at least 200 and the differential is less than 50, the gas discharge valve is opened to permit the sale of gas until the minimum differential of 50 is reached. If the differential is not reached by the time the casing decreases to the casing bleed setting, the gas discharge valve closes. The casing pressure increases above the casing bleed setting and the gas discharge valve 26 opens, and this procedure is repeated until the differential setting is reached, whereupon the gas discharge valve 26 is closed, and the oil discharge valve 38 is open, thereby permitting the plunger to cycle.

For a gas well, the control system opens the gas discharge valve to sell gas. If differential is not reached, the gas discharge valve is stepped open every 45 minutes, thereby insuring that the gas discharge valve is stepped to a fully open condition at least once every 45 minutes.

While in accordance with the provisions of the Patent Statutes, the preferred form of the invention has been illustrated and described, it will be apparent to those skilled in the art that changes and modifications may be made without deviating from the inventive concepts set forth above.

What is claimed is:

1. Apparatus for operating a gas and oil producing well of the plunger lift type including a cylindrical tubing (10) mounted in concentrically spaced relation within a vertical well casing (4) that is embedded in an oil and gas producing formation, the casing and tubing being perforated adjacent their lower ends; a plunger (14) mounted for vertical movement in said tubing, said plunger normally having an initial lower position adjacent the lower end of the tubing and being vertically displaceable toward an upper position adjacent the upper end thereof; an outlet conduit (22) connected at one end with the upper end of the tubing, said outlet conduit including gas and oil branch legs (22a, 22b) for discharging gas and oil, respectively; and normally closed gas and fluid discharge valves (26, 38) connected in said gas and oil branches, respectively, comprising (a) means (U25) for comparing the casing (50) and tubing (66) pressures;

(b) means (26a) for opening the gas discharge valve when the difference between casing pressure and tubing pressure is [greater] *less* than a selected [difference] *minimum* value (R81), thereby to deliver gas via the gas branch leg, and to permit the build up of oil in the tubing above the plunger;

(c) means (38a) for opening the fluid discharge valve when the casing pressure exceeds a selected lift value (R84), whereby the plunger moves upwardly in the tubing, and oil is discharged via the oil branch leg;

(d) means for closing the gas discharge valve when casing pressure falls below a selected casing bleed value (R82);

(e) means (134) for initially closing the fluid discharge valve when the plunger reaches its upper position adjacent the upper end of the tubing, thereby interrupting the discharge of oil, and initiating the fall of the plunger toward the bottom of the tubing; and (f) means operable after a given first period following closing of said fluid discharge valve for reopening said fluid discharge valve only when both:

(1) the oil level produces a pressure difference greater than said selected difference value, and (2) the casing pressure is greater than the selected lift value.

2. Apparatus as defined in claim 1, and further including (g) means for opening the gas discharge valve at the end of said first period when both the pressure differential is less than said selected difference value, and when the casing pressure is above the selected casing bleed valve.

3. Apparatus as defined in claim 2, and further including means (R80) for closing the gas discharge valve when the difference between casing pressure and tubing prssure exceeds a given maximum value.

4. Apparatus for operating a gas and oil producing well of the plunger lift type including a cylindrical tubing (10) mounted in concentrically spaced relation within a vertical well casing (4) that is embedded in an oil and gas producing formation, the casing and tubing being perforated adjacent their lower ends; a plunger (14) mounted for vertical movement in said tubing, said plunger normally having an initial lower position adjacent the lower end of the tubing and being vertically displaceable toward an upper position adjacent the upper end thereof; an outlet conduit (22) connected at one end with the upper end of the tubing, said outlet conduit including gas and oil branch legs (22a, 22b) for discharging gas and oil, respectively; and normally closed gas and fluid discharge valves (26, 38) connected in said gas and oil branches, respectively, comprising (a) means (V25) for comparing the casing (50) and tubing (66) pressures;

(b) means (26a) for opening the gas discharge valve when the difference between the casing pressure and tubing pressure is [greater] *less* than a selected [difference] *minimum* value (R81), thereby to deliver gas via the gas branch leg, and to permit the build up of oil in the tubing above the plunger;

(c) means (38a) for opening the fluid discharge valve when the casing pressure exceeds a selected lift value (R84), whereby the plunger moves upwardly in the tubing, and oil is discharged via the oil branch leg;

(d) means for closing the gas discharge valve when casing pressure falls below a selected casing bleed value (R82);

(e) means (134) for initially closing the fluid discharge valve when the plunger reaches its upper position adjacent the upper end of the tubing, thereby interrupting the discharge of oil, and initiating the fall of the plunger toward the bottom of the tubing;

(f) means operable after a given first period following closing of said fluid discharge valve for reopening said fluid discharge valve only when both:

(1) the oil level produces a pressure difference greater than said selected difference value, and (2) the casing pressure is greater than the selected lift value;

(g) means for opening the gas discharge valve at the end of said first period when both the pressure differential is less than said selected difference value, and when the casing pressure is above the selected casing bleed value;

(h) means (R80) for closing the gas discharge valve when the difference between casing pressure and tubing pressure exceeds a given maximum value; and (i) means for closing the fluid discharge valve in the event that tubing exceeds a given maximum safe pressure value (R83).

5. Apparatus as defined in claim 4, and further including means (U9A) for initiating a selected second period at the end of said first period, and means for closing the fluid discharge valve at the end of said second period.

6. Apparatus as defined in claim 5, and further including display means (152) for presenting a first indication at the beginning of said second period.

7. Apparatus as defined in claim 6, wherein said display means is operable to present a second indication in the event that the plunger fails to reach the top of the tubing during said second period.

8. Apparatus as defined in claim 7, and further including means (S12) for indicating static casing pressure on said display means.

9. Apparatus as defined in claim 7, and further including means (S13) for indicating static tubing pressure on said display means.

10. Apparatus as defined in claim 7, and further including means (S14) for indicating on said display means the difference between casing pressure and tubing pressure.

11. Apparatus as defined in claim 7, and further including means (S15) for indicating on said display means the selected casing bleed pressure value.

12. Apparatus as defined in claim 7, and further including means (S16) for indicating on said display means the selected lift pressure.

13. Apparatus as defined in claim 7, and further including means (S17) for indicating on said display means the selected maximum pressure difference value.

14. Apparatus as defined in claim 7, and further including means (S18) for indicating on said display means the selected minimum pressure difference value.

15. Apparatus as defined in claim 7, and further including means (S19) for indicating on said display means the maximum safe discharge pressure.

16. Apparatus as defined in claim 7, and further including means (S20) for indicating on the display means the number of cycles of operation of the plunger within a given period of time.

17. Apparatus as defined in claim 16, and further including means (S21) for restarting the operation of the system.

18. Apparatus as defined in claim 7, and further including emergency override switch means (S30) for closing both of said gas and fluid discharge valves.

19. Apparatus as defined in claim 7, and further including plunger sensor switch means (S4) for causing the fluid discharge valve (38) to remain open after the plunger (14) has reached the surface, thereby to permit the casing pressure to bleed down to the bleed setting of the bleed resistor (R82).

20. Apparatus as defined in claim 19, and further including override means operable upon the elapse of a predetermined up time period (S5) for overriding the operation of said plunger sensor means.

21. Apparatus as defined in claim 7, and further including first means (S5) for adjusting the length of said second period.

22. Apparatus as defined in claim 21, and further including second means (S6) for adjusting the length of said first period.

23. Apparatus as defined in claim 22, and further including range switch means (S2) for adjusting the operating ranges of the plunger first and second adjusting means.

24. Apparatus as defined in claim 7, and further including manual/automatic switch means (S3) for switching the system to a manual operating mode; and first (S9) and second (S10) switch means for opening and closing the gas discharge valve, respectively, when the manual/automatic switch means is in the manual operating mode.

25. Apparatus as defined in claim 24, and further including third (S8) and fourth (S11) switch means for opening and closing the fluid discharge valve, respectively, when the manual/automatic switch means is in the manual operating mode.

26. Apparatus as defined in claim 1, wherein said gas delivery valve opening means includes means (U44, U30) for progressively opening the gas delivery valve in incremental steps, thereby to prevent a sudden surge of gas from bringing the plunger to the upper end of the tubing while in a dry condition.

27. Apparatus as defined in claim 1, wherein said means for opening the gas delivery valve comprises first diaphragm motor means (26a); wherein said means for opening the fluid delivery valve comprises second diaphragm motor means (38a); and further including conduit means (48) including a first branch line containing a first pressure regulator (78) for supplying gas from the casing to operate said first diaphragm motor, and a second branch line containing a second pressure regulator (74) for supplying gas from the casing to operate said second diaphragm motor.

28. Apparatus as defined in claim 27, and further including first and second gauges (86, 106) for indicating the gas pressures of said first and second branch conduits, respectively.

29. Apparatus as defined in claim 28, and further including first (80) and second (98) needle valve means connected in said first and second conduits, respectively, for controlling the speed of operation of said first and second diaphragm motor means, respectively.

30. Apparatus as defined in claim 27, and further including means including first solenoid means (110) for operating said first diaphragm pressure motor to open said gas discharge valve, second solenoid means (114) for operating said second diaphragm pressure motor to open said fluid discharge valve, third solenoid means (116) for operating said second pressure motor to close said fluid discharge valve, and fourth solenoid means (124) for operating said first diaphragm pressure motor to close said gas discharge valve.

* * * * *